(12) United States Patent
Akamatsu et al.

(10) Patent No.: US 8,699,624 B2
(45) Date of Patent: Apr. 15, 2014

(54) RECEIVING APPARATUS AND DATA TRANSMISSION APPARATUS

(75) Inventors: Manabu Akamatsu, Kanagawa (JP); Tsutomu Hamada, Kanagawa (JP); Takeshi Kamimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 45 days.

(21) Appl. No.: 13/103,391

(22) Filed: May 9, 2011

(65) Prior Publication Data

US 2012/0140855 A1 Jun. 7, 2012

(30) Foreign Application Priority Data

Dec. 7, 2010 (JP) ................................. 2010-272421

(51) Int. Cl.
*H03K 9/00* (2006.01)
(52) U.S. Cl.
USPC .......................................................... 375/316
(58) Field of Classification Search
None
See application file for complete search history.

(56) References Cited

U.S. PATENT DOCUMENTS

| 4,434,459 | A | * | 2/1984 | Holland et al. ................ 712/210 |
| 5,387,911 | A | * | 2/1995 | Gleichert et al. ................ 341/95 |
| 5,408,476 | A | * | 4/1995 | Kawai et al. .................... 714/775 |
| 5,687,181 | A |   | 11/1997 | Suemura et al. |
| 6,389,572 | B1 | * | 5/2002 | Garrabrant et al. ........... 714/780 |
| 6,779,148 | B2 | * | 8/2004 | Tanaka .......................... 714/753 |
| 7,103,830 | B1 | * | 9/2006 | Dong ............................. 714/784 |
| 7,535,957 | B2 | * | 5/2009 | Ozawa et al. ................. 375/238 |
| 7,573,916 | B1 | * | 8/2009 | Bechtolsheim et al. ...... 370/542 |
| 7,802,167 | B1 | * | 9/2010 | Gorshe ......................... 714/762 |
| 8,099,653 | B2 | * | 1/2012 | Kanda et al. .................. 714/776 |
| 8,218,510 | B2 | * | 7/2012 | Kim et al. ..................... 370/337 |
| 2003/0016758 | A1 | * | 1/2003 | Wu et al. ....................... 375/259 |
| 2003/0185251 | A1 | * | 10/2003 | Ichino et al. ................. 370/535 |
| 2003/0235298 | A1 | * | 12/2003 | Hanounik ....................... 380/29 |
| 2004/0083419 | A1 | * | 4/2004 | Chiba et al. ................... 714/799 |
| 2004/0153952 | A1 | * | 8/2004 | Sharma et al. ................ 714/781 |
| 2007/0139232 | A1 | * | 6/2007 | Venkata et al. ................ 341/50 |
| 2007/0198904 | A1 | * | 8/2007 | Yoshida ........................ 714/785 |
| 2008/0045151 | A1 | * | 2/2008 | Goto et al. ..................... 455/60 |
| 2008/0163011 | A1 | * | 7/2008 | Krans ........................... 714/712 |
| 2008/0294966 | A1 |   | 11/2008 | Kuroishi et al. |
| 2009/0063936 | A1 | * | 3/2009 | Kanda et al. .................. 714/776 |
| 2010/0050049 | A1 | * | 2/2010 | Lin et al. ...................... 714/758 |

(Continued)

FOREIGN PATENT DOCUMENTS

JP   A 5-227041   9/1993
JP   A 7-273742   10/1995

(Continued)

*Primary Examiner* — Chieh M Fan
*Assistant Examiner* — Bahman Badipour
(74) *Attorney, Agent, or Firm* — Oliff PLC

(57) ABSTRACT

According to an aspect of the invention, a receiving apparatus includes a receiving unit, a reverse conversion unit, and an extracting unit. The receiving unit receives conversion data which is generated, based on a predetermined first rule, by converting transmission data including a plurality of bits and data including an error detection code for detecting an error of the transmission data. The reverse conversion unit reverse-converts, based on a predetermined second rule, the conversion data received by the receiving unit and reverse data generated by reversing a part of bits of the received conversion data to generate a plurality of reverse conversion data. The extracting unit extracts, from the plurality of the reverse conversion data, the reverse conversion data for which an error is not detected in an error detection based on the error detection code.

5 Claims, 6 Drawing Sheets

(56) References Cited

U.S. PATENT DOCUMENTS

| | | | |
|---|---|---|---|
| 2010/0246699 A1* | 9/2010 | Moriizumi | 375/260 |
| 2010/0251043 A1* | 9/2010 | Anzou et al. | 714/719 |
| 2011/0050490 A1* | 3/2011 | Matsue | 342/357.23 |
| 2012/0087182 A1* | 4/2012 | Kim et al. | 365/163 |

FOREIGN PATENT DOCUMENTS

| | | | | |
|---|---|---|---|---|
| JP | A 10-013251 | | 1/1998 | |
| JP | 2001-186108 | * | 7/2001 | H03M 13/15 |
| JP | 2001186108 | * | 7/2001 | H03M 13/15 |
| JP | A 2008-294757 | | 12/2008 | |

* cited by examiner

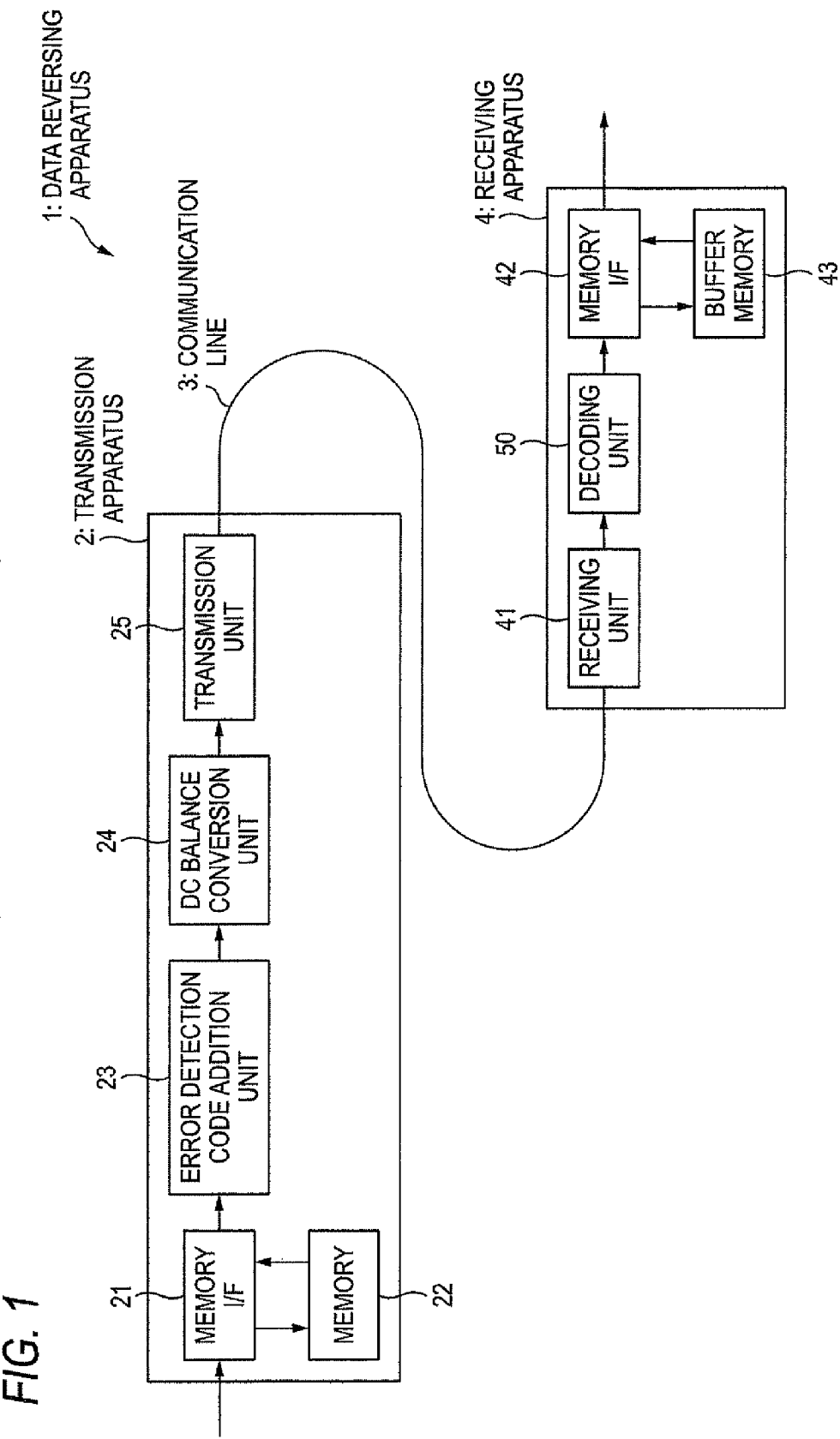

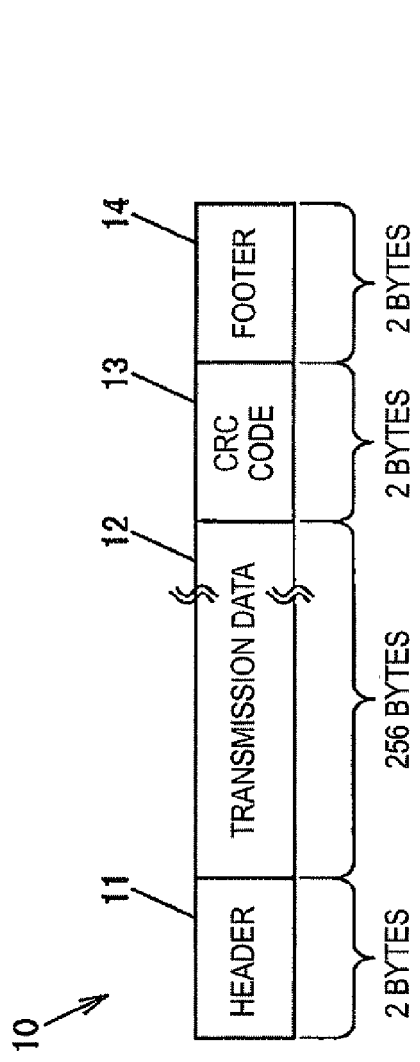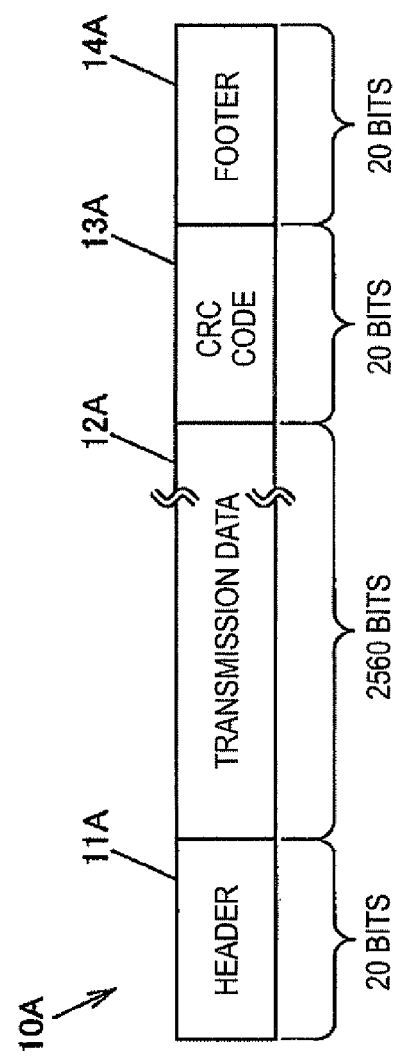
FIG. 2A
FIG. 2B

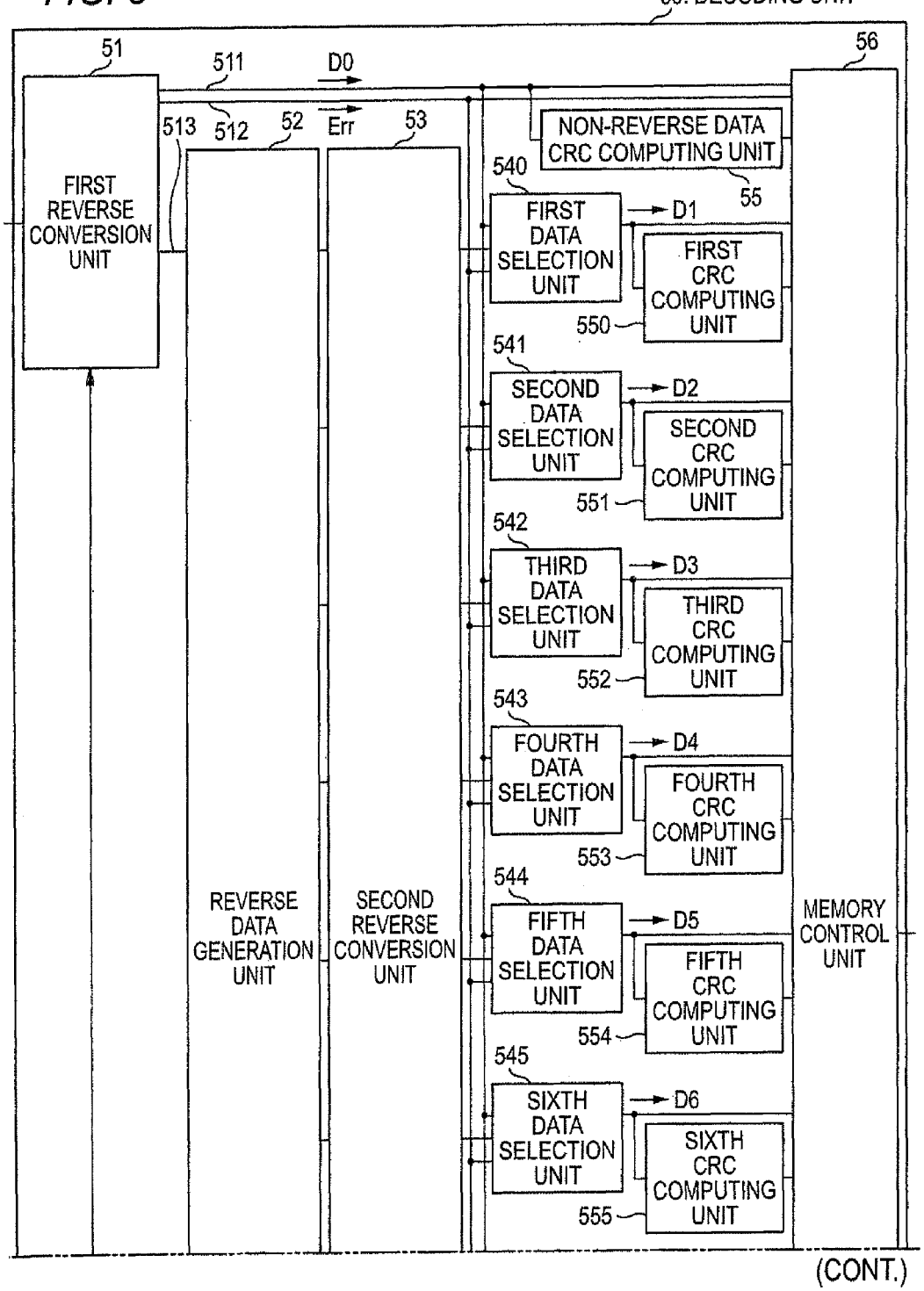
FIG. 3 (FIRST EXEMPLARY EMBODIMENT)

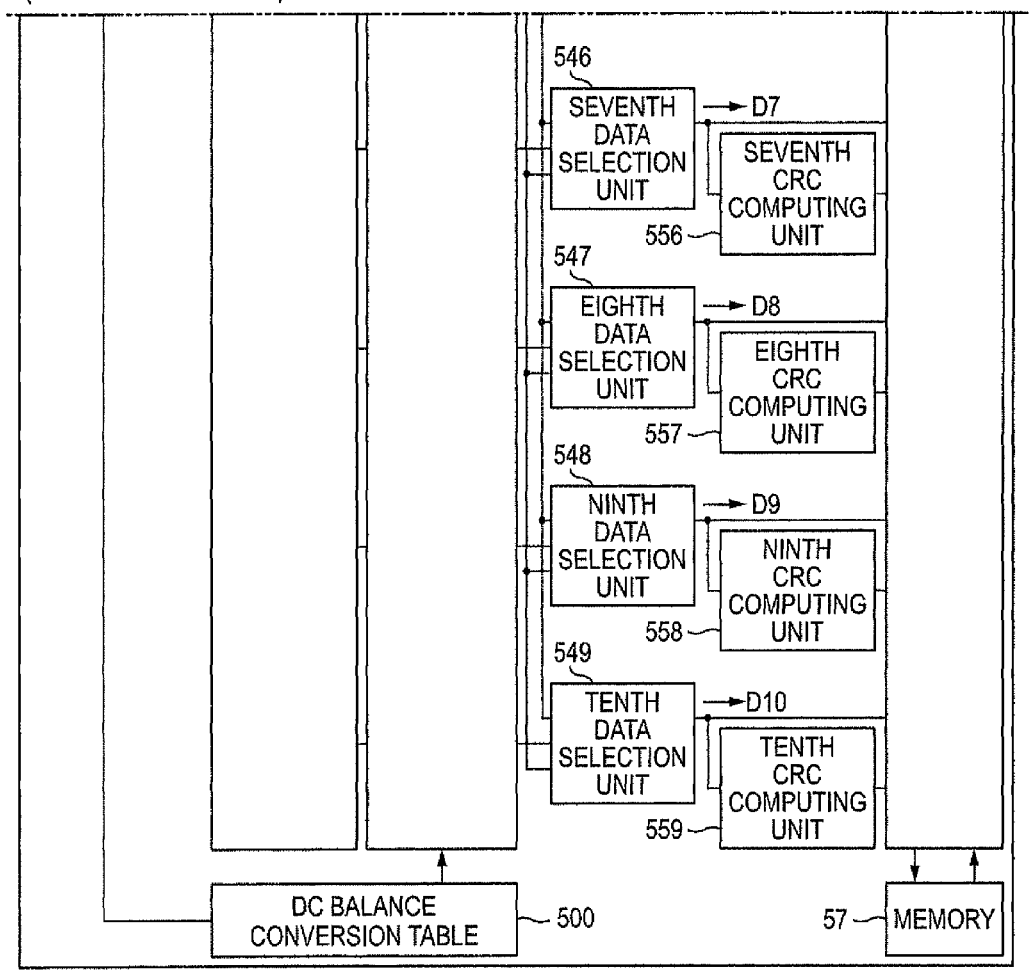

(FIRST EXEMPLARY EMBODIMENT)

(FIRST EXEMPLARY EMBODIMENT)

RECEIVING APPARATUS AND DATA TRANSMISSION APPARATUS

CROSS-REFERENCE TO RELATED APPLICATIONS

This application is based upon and claims priority under 35 USC 119 from Japanese Patent Application No. 2010-272421, filed Dec. 7, 2010.

BACKGROUND

1. Technical Field

The present invention relates to a receiving apparatus and a data transmission apparatus.

2. Related Art

With respect to transmission data transmitted through a communication line, a data transmission apparatus for performing 8B/10B conversion that improves DC balance by equalizing the number of bit signals '0' and '1' has been known in the related art.

SUMMARY OF THE INVENTION

According to an aspect of the invention, a receiving apparatus includes a receiving unit, a reverse conversion unit, and an extracting unit. The receiving unit receives conversion data which is generated, based on a predetermined first rule, by converting transmission data including a plurality of bits and data including an error detection code for detecting an error of the transmission data. The reverse conversion unit reverse-converts, based on a predetermined second rule, the conversion data received by the receiving unit and reverse data generated by reversing a part of bits of the received conversion data to generate a plurality of reverse conversion data. The extracting unit extracts, from the plurality of the reverse conversion data, the reverse conversion data for which an error is not detected in an error detection based on the error detection code.

BRIEF DESCRIPTION OF THE DRAWINGS

Exemplary embodiments of the invention will be described in detail based on the following figures, wherein:

FIG. 1 is a block diagram showing the constitution of the data transmission apparatus according to the first exemplary embodiment of the present invention;

FIGS. 2A and 2B show examples of data before and after DC balance conversion;

FIG. 3 is a block diagram showing the constitution of a decoding unit;

DETAILED DESCRIPTION

First Exemplary Embodiment

Figure 4:
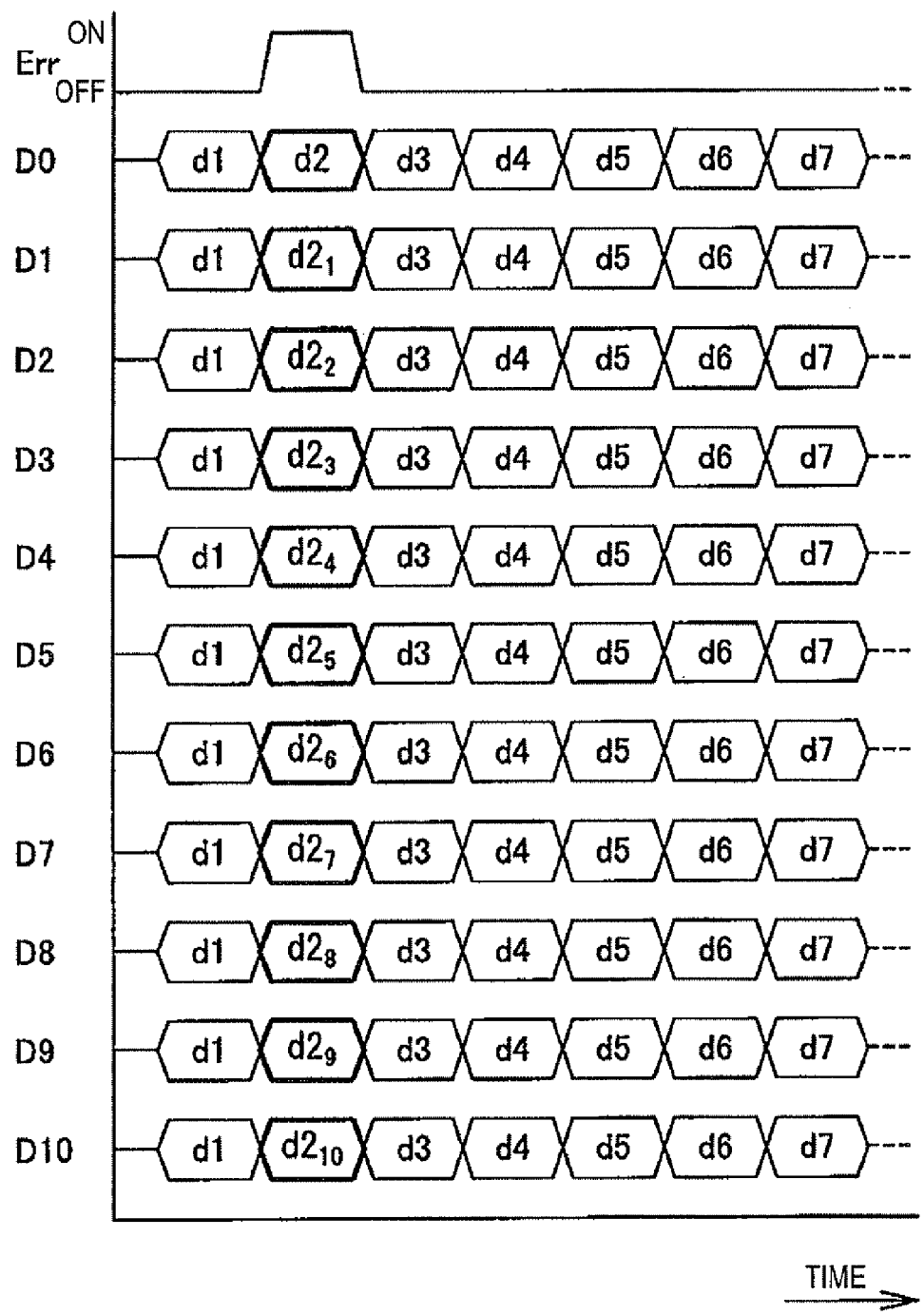
FIG. 4 is a timing chart explaining the operation of the decoding unit.

The first exemplary embodiment is described with reference to FIGS. 1 to 5B.

(Constitution of Data Transmission Apparatus)

FIG. 1 is a block diagram showing the constitution of the data transmission apparatus according to the first exemplary embodiment of the present invention. The data transmission apparatus 1 includes a transmission apparatus 2, a communication line 3 connected to the transmission apparatus 2, and a receiving apparatus 4 capable of communicating with the transmission apparatus 2 through the communication line 3. For example, a differential signal line including a pair of signal lines transmitting differential signals whose polarities are reversed to each other may be used as the communication line 3.

(Constitution of Transmission Apparatus)

The transmission apparatus 2 includes a memory interface 21, a memory 22 connected to the memory interface 21, an error detection code addition unit 23, a DC balance conversion unit 24, and a receiving unit 25.

The memory interface 21 receives transmission data from an external device and first stores the transmission data in a memory 22 including a storage device such as RAM (Random Access Memory), etc. The memory interface 21 reads the transmission data stored in the memory 22 and outputs the read transmission data to the following error detection code addition unit 23.

The error detection code addition unit 23 generates an error detection code for detecting an error of the transmission data based on the transmission data outputted from the memory interface 21. The error detection code addition unit 23 adds the generated error detection code, a header, and a footer to the transmission data and outputs the transmission data to the following DC balance conversion unit 24.

The error detection code generated and added by the error detection code addition unit 23 may detect an error occurred during data transmission by, for example, noise, but may not correct the error. For example, a CRC (Cyclic Redundancy Check) code may be used as the error detection code.

The transmission data and error detection code outputted from the error detection code addition unit 23 are the subject data of the DC balance conversion unit 24. The DC balance conversion unit 24 performs DC balance conversion to improve DC balance so that signal '0' or '1' does not continue during the transmission through the communication line 3.

This exemplary embodiment describes the case where 8B/10B conversion is applied as the DC balance conversion. 8B/10B conversion converts 8-bit byte data into 10-bit data in data unit with reference to a pre-registered conversion table. By 8B/10B conversion, for example, 8-bit data of '00000000' is converted into 10-bit data of '1001110100,' and an 8-bit data of '11111111' is converted into 10-bit data of '1010110001.' 8B/10B conversion causes a 20% of overhead, but may embed a clock signal for the synchronization of a receiving side of a bit stream transmitted in serial so that the 8B/10B conversion may simultaneously transmit data and clock through the same signal line.

The DC balance conversion unit 24 generates conversion data, in which the subject data converts each 8-bit into 10-bit data with reference to the conversion table, and outputs the conversion data to the following transmission unit 25.

The transmission unit 25 converts the conversion data outputted from the DC balance conversion unit 24 in parallel/serial and transmits the conversion data by a transmission circuit such as a differential transceiver, etc. to the receiving apparatus 4 through the communication line 3.

FIG. 2A shows one example of data before DC balance conversion by the DC balance conversion unit 24. FIG. 2B shows one example of data after DC balance conversion by the DC balance conversion unit 24.

As shown 2A, in a packet 10 before DC balance conversion, a CRC code 13 is added to transmission data 12 as an error detection code. A header is added to the front of the transmission data 12 and a footer 14 is added to the back of the CRC code 13. In the example shown in this drawing, the transmission data 12 is 256 bytes (2048 bits), the CRC code 13 is 2 bytes (16 bits), and the header 11 and footer 14 each is 2 bytes (16 bits).

In a packet 10A after DC balance conversion, the transmission data 12A is 2560 bits, the CRC code 13A is 20 bits, and the header 11A and footer 14A each is 20 bits. Such packet 10A is one example of DC balance converted conversion data.

(Constitution of Receiving Apparatus)

The receiving apparatus 4 includes a receiving unit 41 connected to the communication line 3, a decoding unit 50 for decoding data received by the receiving unit 41, a memory interface 42, and a buffer memory 43 connected to the memory interface 42.

The receiving unit 41 receives serial data transmitted from the transmission apparatus 2 through the communication line 3, converts the serial data into 10-bit parallel data, and outputs the 10-bit parallel data to the decoding unit 50. In the decoding unit 50 following the receiving unit 41, 1 set of the 10-bit parallel data is regarded as one unit.

The decoding unit 50 decodes the parallel data outputted from the receiving unit 41, extracts transmission data from the decoded parallel data, and outputs the transmission data to the memory interface 42. Detailed explanation of the decoding unit follows.

The memory interface 42 stores the transmission data outputted from the decoding unit 50 in a memory 43 including a storage unit such as RAM, etc. The memory interface 42 outputs the transmission data stored in the memory 43 in accordance with a read signal from external.

(Constitution of Decoding Unit)

FIG. 3 is a block diagram showing the constitution of the decoding unit 50. The decoding unit 50 includes hardware such as ASIC (Application Specific Integrated Circuit), etc.

The decoding unit 50 includes a first reverse conversion unit 51, a reverse data generation unit 52, a second reverse conversion unit 53, first to tenth data selection units 540-549, first to tenth CRC computing units 550-559, a non-reverse data CRC computing unit 55, a memory control unit 56, and a memory 57 as a storage unit. The first reverse conversion unit 51, the reverse data generation unit 52, and the second reverse conversion unit 53 are examples of the reverse conversion unit of the present invention. The first to tenth CRC computing units 550-559, the non-reverse data CRC computing unit 55, and the memory control unit 56 are examples of the extraction unit of the present invention.

The first reverse conversion unit 51 sequentially performs DC balance reverse conversion of the 10-bit parallel data obtained from the receiving unit 41 by the one unit with reference to a DC balance conversion table 500. The DC balance conversion table 500 is set to correspond to the conversion table referred to by the DC balance conversion unit 24 of the transmission apparatus 2.

The first reverse conversion unit 51 outputs DC balance reverse-converted 8-bit data as output data D0 to a data bus 511. If the 8-bit data, which corresponds to the 10-bit data obtained from the receiving unit 41, is not registered in the DC balance conversion table 500 (if reverse conversion is unavailable), the first reverse conversion unit 51 outputs an error signal Err indicating there was a reverse conversion error to a signal line 512, while outputting 8-bit data with a predetermined value (for example, '00000000') as the output data D0 to the data bus 511. The error signal Err is maintained ON only when the first reverse conversion unit 51 outputs the predetermined value.

Additionally, the first reverse conversion unit 51 outputs the 10-bit data before DC balance conversion is applied (data obtained from the receiving unit 41) to the 10-bit data bus 513.

The reverse data generation unit 52 obtains the parallel 10-bit data converted by the receiving unit 41 through the data bus 513 and generates reverse data including ten 10-bit, in which each bit from the first bit (least significant bit) to the tenth bit (most significant bit) of the 10-bit data is reversed. That is, one bit of 10-bit is reversed in each of the ten 10-bit.

The second reverse conversion unit 53 performs DC balance reverse conversion to each of the ten reverse data generated by the reverse data generation unit 52 with reference to the DC balance conversion table 500, and generates ten 8-bit data corresponding to each reverse data.

The first reverse conversion data that is outputted from the first reverse conversion unit 51 to the data bus 511; the second reverse conversion data which is outputted from the second reverse conversion unit 53 and which is generated by the reverse-conversion of the reverse data (any one of the first to tenth bits is reversed); and an error signal Err outputted from the first reverse conversion unit 51 to the signal line 512 are inputted in the first to tenth data selection units 540-549. The second reverse conversion data, in which the reverse data (the first bit is reversed) is reverse-converted, is inputted to the first data selection unit 540. The second reverse conversion data, in which the reverse data (the second bit is reversed) is reverse-converted, is inputted to the second data selection unit 541. The second reverse conversion data, in which the reverse data (the third bit is reversed) is reverse-converted, is inputted to the third data selection unit 542. Input data in following data selection units are omitted here.

If the error signal Err is OFF, the first to tenth data selection units 540-549 output the first reverse conversion data as reverse data D1-D10. If the error signal Err is ON, the first to tenth data selection units 540-549 output the second reverse conversion data as reverse data D1-D10.

In other words, the first to tenth data selection units 540-549 output the second reverse conversion data when reverse conversion is unavailable in the first reverse conversion unit 51 and the predetermined value is outputted as the first reverse conversion data. The first to tenth data selection units 540-549 output the first reverse conversion data when the reverse conversion is available in the first reverse conversion unit 51.

Such output data D1-D10 is inputted in the first to tenth CRC computing units 550-559 and the memory control unit 56.

The first to tenth CRC computing units 550-559 sequentially compute a CRC code as an error detection code based on the first or second reverse conversion data outputted from the first to tenth data selection units 540-549, and output the CRC code to the memory control unit 56.

The non-reverse data CRC computing unit 55 connects to the data bus 511, sequentially computes the CRC code of the first reverse conversion data outputted from of the first reverse conversion unit 51, and outputs the CRC code to the memory control unit 56.

The non-reverse data CRC computing unit 55 and the first to tenth CRC computing units 550-559 are configured to output the CRC code to the memory control unit 56 later than the change period of the output data D0-D10 by one period.

The memory control unit 56 sequentially stores the output data D0 from the first reverse conversion unit 51 and the output data D1-D10 outputted from the first to tenth data selection units 540-549 in each different area of the memory 57.

When the first reverse conversion unit 51 obtains a CRC code as a reverse-converted error detection code (CRC code included in the packet received by the receiving unit 31), the memory control unit 56 determines whether the obtained CRC code (hereinafter, this CRC code is referred to as "receiving CRC code") matches the CRC code inputted from the non-reverse data CRC computing unit 55. As a result of such determination, if the two CRC codes match, the memory control unit 56 reads a series of data sequentially storing the output data D0 from the memory 57 and outputs the data to the following memory interface 42.

If the receiving CRC code and the CRC code inputted from the non-reverse data CRC computing unit 55 do not match, the memory control unit 56 determines whether there is any matching between the CRC codes inputted from the first to tenth CRC computing units 550-559 and the receiving CRC. As a result of such determination, if there is matching, the memory control unit 56 reads a series of data sequentially storing the output data corresponding to the CRC code that matches the receiving code among the output data D1-D10 of the first to tenth data selection units 540-549, and outputs the data as error-corrected transmission data to the following memory interface 42.

For example, if the CRC code inputted from the fourth CRC computing unit 553 matches the receiving CRC code, the memory control unit 56 reads a series of data sequentially storing the output data D4 of the fourth selection unit 543 and outputs the data to the following memory interface 42.

If there is no matching between the CRC codes inputted from the first to tenth CRC computing units 550-559 and the receiving CRC, the memory control unit 56 does not output the data to the memory interface 42 and outputs a retransmission request signal of a packet to the transmission apparatus 2.

The memory control unit 56 may be configured to output to the memory interface 42 data sequentially storing any one of the output data D1-D10 of the first to tenth data selection units 540-549, which corresponds to the CRC code among the CRC codes inputted from the first to tenth CRC computing units 550-559 that matches the receiving CRC, without determining whether the receiving CRC code matches the CRC code inputted from the non-reverse data CRC computing unit 55. Under such constitution, if there is no error in the data received by the receiving unit 41, correct data may be outputted because all the CRC codes inputted from the first to tenth CRC computing units 550-559 match the receiving CRC code. Such constitution may omit the non-reverse data computing unit 55.

(Operation of Decoding Unit)

FIG. 4 is a timing chart showing one example of the change in the error signal Err, the output data D0 of the first reverse conversion unit 51, and the output data D1-D10 of the first to tenth data selection units 540-549 when the reverse conversion of the second byte data d2 is unavailable among the transmission data received from the transmission apparatus 2.

When the error signal Err is ON, the first to tenth data selection units 540-549 output the first bit reverse and the reverse-converted second reverse conversion data. Thus, when d2 is indicated in the output data D0, the first to tenth bits are indicated as $d2_1$-$d2_{10}$, respectively, in the output data D1-D10. When the error signal Err is OFF, data that is the same as the output data D0 is indicated in the output data D1-D10 of the first to tenth data selection units 540-549.

Figure 5A:
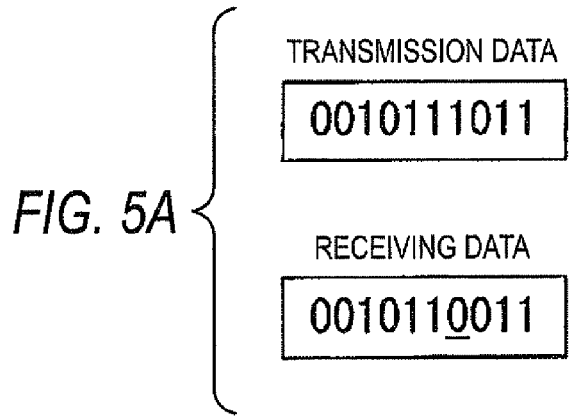
FIGS. 5A and 5B show specific examples of error correction by the decoding unit.
Figure 5B:
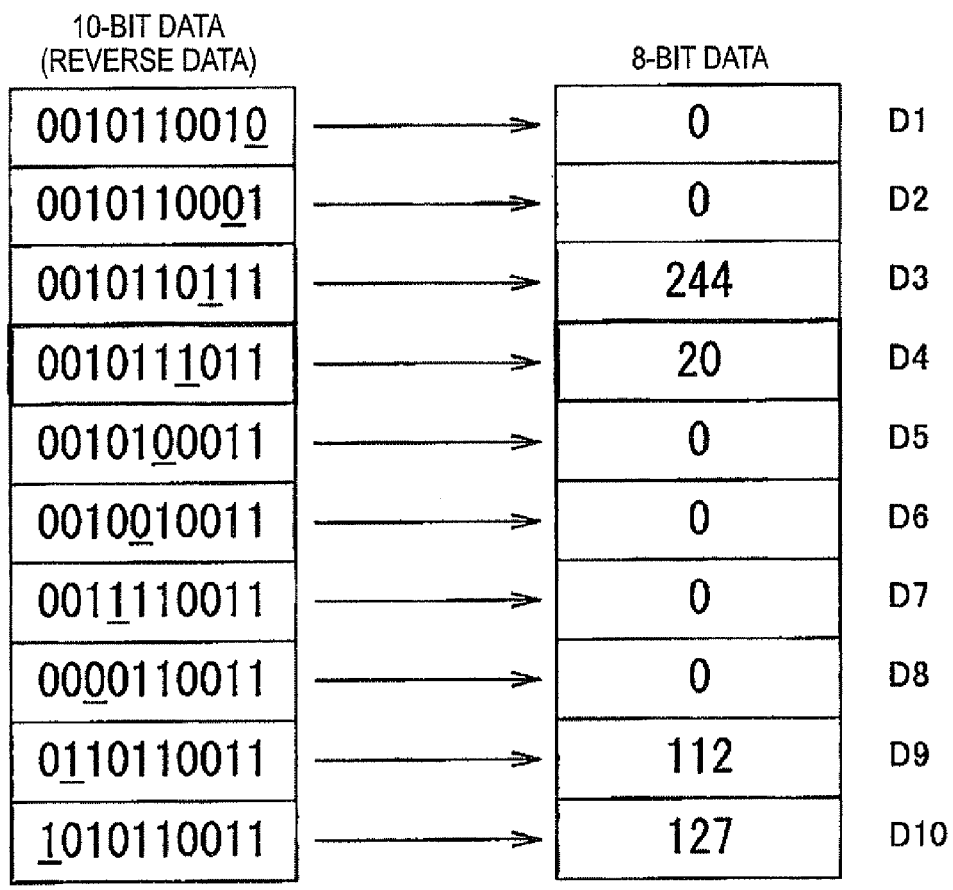

FIGS. 5A and 5B show specific examples of error correction by an error correction unit 321c. FIG. 5A shows 10 bits of each of the transmission data transmitted from the transmission apparatus 2 and the receiving data received by the receiving apparatus. FIG. 5B shows data, in which each 1 bit of the 10 bits for which an error occurs in DC balance reverse conversion is reversed, and the corresponding 8-bit data.

As shown in FIG. 5A, the transmission is '0010111011,' whereas the receiving data is '0010110011,' in which an error occurs in the fourth bit. In this case, reverse conversion by the first reverse conversion unit 51 is unavailable and an error signal Err is ON by one period.

As shown in FIG. 5B, the reverse data generation unit 52 generates ten reverse data, in which each of the first bit to tenth bit of the 10-bit data is reversed. The second reverse conversion unit 53 reversely converts such reverse data with reference to the DC balance conversion table 500 and outputs the data to the first to tenth data selection units 540-549. If it is not possible to obtain the corresponding 8-bit data in the DC balance conversion table 500, the second reverse conversion unit 53 outputs a predetermined value (for example, '0' in FIG. 5B) to the first to tenth data selection units 540-549.

As a result, in a timing when an error signal Err is ON, each data in the right side of FIG. 5B (decimal notation) is indicated as the output data D1-D10. Among the output data D1-D10, since D4, i.e., output data in which the fourth bit is converted and is reverse-converted, corresponds to the receiving data, the CRC data outputted from the fourth CRC computing unit 553 matches the receiving CRC data and a series of data sequentially outputted from the fourth data selection unit 543 and stored in the memory 57 is outputted to the memory interface as error-corrected transmission data.

Other Exemplary Embodiment

The present invention is not limited to the first exemplary embodiment and various modification of the present invention may be made without changing the summary of the present invention.

For example, in the first exemplary embodiment, the reverse data generation unit 52 generates a plurality of reverse data, in which 1 bit is reversed among 10 bits. However, the reverse data generation unit 52 may generate a plurality of reverse data (55 reverse data), in which 1 bit and 2 bits are reversed among 10 bits and may provide a second reverse conversion unit, a data selection unit, and a CRC computing unit that correspond to the reverse data. Also, the decoding unit may be configured to reverse at least 3 bits.

In the first exemplary embodiment, the transmission apparatus 2 performs 8B/10B conversion and the receiving apparatus 4 performs 8B/10B reverse conversion. However, the present invention is not limited to such embodiment. For example, the transmission apparatus 2 may perform encoding based on a predetermined rule and the receiving apparatus 4 may perform decoding based on a predetermined decoding order corresponding to the encoding order in the transmission apparatus 2.

In the first exemplary embodiment, the decoding unit 50 includes hardware such as ASIC (Application Specific Integrated Circuit), etc. However, the present invention is not limited to such embodiment. The function of each unit of the decoding unit 50 may be implemented by a CPU (Central Processing Unit) that is operated based on a pre-stored program.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

DESCRIPTION OF REFERENCE NUMERALS

1 . . . data transmission apparatus, 2 . . . transmission apparatus, 3 . . . receiving apparatus, 4 . . . communication line, 10, 10A . . . packet, 11, 11A . . . header, 12, 12A . . . transmission data, 13, 13A . . . CRC code, 14, 14A . . . footer, 21 . . . memory interface, 22 . . . memory, 23 . . . detection code addition unit, 24 . . . DC balance conversion unit, 25 . . . transmission unit, 41 . . . receiving unit, 42 . . . memory interface, 43 . . . buffer memory, 50 . . . decoding unit, 51 . . . first reverse conversion unit, 52 . . . reverse data generation unit, 53 . . . second reverse conversion unit, 55 . . . non-reverse data CRC computing unit, 56 . . . memory control unit, 57 . . . storage unit, 500 . . . DC balance conversion table, 540-549 . . . first to tenth data selection units, 550-559 . . . first to tenth CRC computing units

What is claimed is:

1. A receiving apparatus comprising:
a receiving unit that receives conversion data which is generated, based on a first predetermined rule, by converting transmission data including a plurality of bits and data including an error detection code for detecting an error of the transmission data;
a reverse conversion unit that reverse-converts, based on a second predetermined rule, the conversion data received by the receiving unit and reverse data generated by reversing a part of bits of the received conversion data to generate a plurality of reverse conversion data, the reverse conversion unit including:
a first reverse conversion unit that obtains the conversion data in the data unit including a plurality of bits from the receiving unit and generates the first reverse conversion data by reverse-converting the obtained data in the data unit;
a reverse data generation unit that generates a plurality of reverse data by reversing a part of bits of the plurality of bits in the data unit obtained by the first reverse conversion unit;
a second reverse conversion unit that generates the second reverse conversion data by reverse-converting the plurality of reverse data generated by the reverse data generation unit, wherein the plurality of reverse conversion data including the first reverse conversion data and the second reverse conversion data; and
a DC balance conversion table, the first reverse conversion unit generates the first reverse conversion data and the second reverse conversion unit generates the second reverse conversion data with reference to the DC balance conversion table; and
an extracting unit that extracts, from the plurality of the reverse conversion data, the second reverse conversion data when the first reverse conversion data is detected to be a predetermined value and an error is detected, and extracts, from the plurality of the reverse conversion data, the first reverse conversion data when the first reverse conversion data is detected to not be a predetermined value and an error is not detected,
wherein DC balance reverse conversion is applied to the first reverse conversion data and to the second reverse conversion data before extraction.

2. The receiving apparatus according to claim 1, wherein the reverse data generation unit generates a plurality of reverse data in which each bit of the plurality of bits in the data unit obtained by the first reverse conversion unit is reversed.

3. A data transmission apparatus comprising:
a receiving apparatus according to claim 1; and
a transmission apparatus that generates transmission data including the plurality of bits and data including the error detection code for detecting an error of the transmission data and transmits conversion data which is generated by converting the generated transmission data based on the first predetermined rule.

4. The receiving apparatus according to claim 1, wherein the first predetermined rule corresponds to the second predetermined rule.

5. The receiving apparatus according to claim 1, wherein the receiving unit receives conversion data via a single communication line.

* * * * *